United States Patent [19]

Parker

[11] Patent Number: 4,856,895
[45] Date of Patent: * Aug. 15, 1989

[54] METHOD AND APPARATUS FOR HEADBOX JET VELOCITY MEASUREMENT

[75] Inventor: Daniel Parker, Caledonia, Ill.

[73] Assignee: Beloit Corporation, Beloit, Wis.

[*] Notice: The portion of the term of this patent subsequent to Mar. 29, 2005 has been disclaimed.

[21] Appl. No.: 178,825

[22] Filed: Apr. 5, 1988

Related U.S. Application Data

[63] Continuation of Ser. No. 573,387, Jan. 24, 1984, abandoned.

[51] Int. Cl.$^4$ .............. G01P 3/36; G01P 5/22
[52] U.S. Cl. .................. 356/28; 73/861.06; 250/239
[58] Field of Search ............. 356/28, 28.5; 73/861.05, 861.06; 250/239, 573

[56] References Cited

U.S. PATENT DOCUMENTS

| | | | |
|---|---|---|---|
| 3,337,393 | 8/1967 | Parker | 162/263 |
| 3,399,565 | 9/1968 | Schmaeng | 73/194 |
| 3,413,850 | 12/1968 | Merrifield | 356/28 |
| 3,464,887 | 9/1969 | Salomon | 162/263 |
| 3,487,686 | 1/1970 | Salomon | 73/194 |
| 3,509,022 | 4/1970 | Salomon | 162/263 |
| 3,562,105 | 2/1971 | Hill | 162/263 |
| 3,620,914 | 11/1971 | Rocheleau | 162/198 |
| 3,867,033 | 2/1975 | Hasinger | 356/103 |
| 3,941,477 | 3/1976 | Schodl | 356/28 |
| 4,201,467 | 5/1980 | Hartmann et al. | 356/28 |
| 4,311,383 | 1/1982 | Ohtsubo | 356/28 |
| 4,476,875 | 10/1984 | Nilsson et al. | 128/666 |
| 4,733,962 | 3/1988 | Brendemuehl | 356/28 |

FOREIGN PATENT DOCUMENTS 1448840 9/1976 United Kingdom.

OTHER PUBLICATIONS

S. Baudvin et al., "A Paper Sheet Contactless Linear Speed Measurement," IFAC PRP, vol. 4, Automation, 1980, pp. 1–13.

D. M. Shellhammer, "An Optical Correlation Flowmeter For Pulp Stock," Toppi, May 1975, vol. 58, No. 5, pp. 113–116.

Bulletin B218.80a, "Eur-Control Optical Flow Transmitter," Eur. Control U.S.A., Inc., Decatur, Ga.

Bolon et al. "A Contribution to the Study of the Stock Jet as It Leaves the Flowbox".

Primary Examiner—Thomas H. Tarcza
Assistant Examiner—Linda J. Wallace
Attorney, Agent, or Firm—Dirk J. Veneman; Raymond W. Campbell; David J. Archer

[57] ABSTRACT

The velocity of a liquid jet, such as the headbox jet of a paper making machine, is measured by cross-correlation of a.c. signal components produced by a pair of light beams received by a pair of photodiodes. The light is supplied by a single source, an incandescent lamp, and is guided by a pair of bifurcated fiber optics mounted above the jet and spaced apart in the flow direction. The a.c. components are filtered to remove flow frequencies, amplified and then analyzed in a spectrum analyzer.

11 Claims, 7 Drawing Sheets

METHOD AND APPARATUS FOR HEADBOX JET VELOCITY MEASUREMENT

This is a continuation of co-pending application Ser. No. 573,387 filed on Jan. 24, 1984, now abandoned.

BACKGROUND OF THE INVENTION

1. Field of the Invention

The present invention relates to headbox jet velocity measurement for optimizing jet to wire velocities.

2. Description of the Prior Art

In U.S. Pat. No. 3,464,887, S. M. Salomon discloses a sensing device which is constructed to be inserted into and withdrawn from a slice delivery strain. A similar type of structure is provided by Solomon in U.S. Pat. No. 3,509,022.

In U.S. Pat. No. 3,562,105, D. B. R. Hill discloses a slice jet measuring apparatus in which a hollow tube element is disposed in a headbox jet to transmit pressure to a pressure measuring gauge or the like.

J. F. Schmaeng, in U.S. Pat. No. 3,399,565, discloses apparatus in which an impact tube may be moved into a stock flow at a slice opening and the static pressure of the fluid in the tube provides an indication of the velocity of stock flow.

All of the patents discussed above require some sort of physical contact with the headbox jet.

In U.S. Pat. No. 3,337,393, J. D. Parker discloses a headbox jet velocity indicator which includes the use of pressure taps upstream of the slice.

In U.S. Pat. No. 3,487,686, Solomon discloses the use of a pair of pressure transducers in the slice delivery area for measuring the time differential between two signals from the headbox jet.

S. Bauduin et al in their article "A Paper Sheet Contactless Linear Speed Measurement", IFAC PRP Automation, Vol. 4, 1980, disclose a technique for measuring linear speed without contact in which speed measurement by correlation of two optical signals is provided using a single signal laser transducer.

The article "An Optical Correlation Flowmeter for Pulp Stock", by Daniel M. Shellhammer, published in the periodical Tappi, May 1975, Vol. 58, No. 5, pp. 113–116, discusses an optical correlation flowmeter for measuring the flow of water or the like through a pipe. A similar device is disclosed in the Eur-Control Optical Flow Transmitter brochure B218.80a, available from Eur-Control U.S.A. Inc., 2579 Park Central Blvd., Decatur, Ga. 30035.

A. A. Rocheleau in U.S. Pat. No. 3,620,914 discloses a scanning system which is employed to measure velocity on the basis of a Doppler frequency shift. In order to measure Doppler shift, a coherent, monochromatic source is required, e.g. a laser. The disadvantage of this type of system is that the laser must be quite powerful in order to obtain a strong signal and could create a hazardous situation to operating personnel.

SUMMARY OF THE INVENTION

It is the object of the present invention to provide a method and apparatus for a contactless jet velocity measurement in order to more accurately set the jet-to-wire speed ratio.

The foregoing object is achieved by providing a pair of optical sensing positions adjacent a headbox slice and above the box jet. The optical sensing positions are spaced apart along the direction of jet flow and are optically coupled to a single light source and a pair of sensors.

Advantageously, the optical coupling is provided by way of bifurcated fiber optic bundles so that a single light source may be employed with at least two light sensors.

Of further advantage is the use of an incandescent light source which may be varied in intensity.

The use of the fiber optic bundles, as set forth below, minimizes the undesirable effects of splashing and the like.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
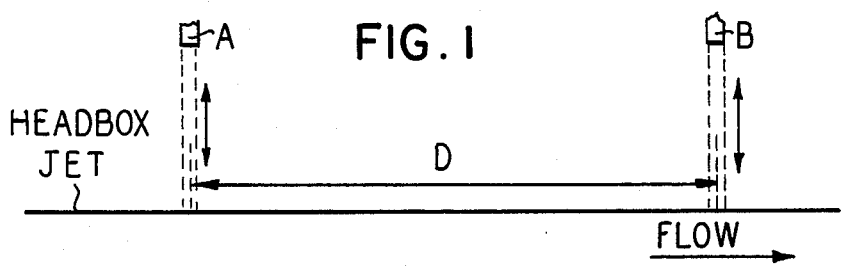
FIG. 1 is a schematic representation of a pair of light sensors spaced apart and positioned above a headbox jet.

Referring to FIG. 1, the cross-correlation flow meter of the present invention measures the time required for surface and internal patterns of the headbox jet to move from a first sensor position A to a second sensor position B which is directly downstream from the sensor position A. Using this time $\theta$ and the distance between the sensors, the velocity of the flow can be calculated as $$V = D/\theta.$$

Cross-correlation is the technique used to calculate the transit time from the output of the sensors. The sensors each have an AC component $f_A(t)$ and $f_B(t)$. In the ideal case, $f_B(t)$ will be identical with $f_A(t)$, the time delayed by $\theta$, so that $f_A(t) = f_B(t+\theta)$.

The cross-correlation function compares these two signals and obtains an output $R_{AB}(t)$ that has a maximum at $\theta$ $$R_{AB}(t) = \frac{1}{P} \int_O^P f_A(t) f_B(t+\theta) \, dt,$$

where P is an integrating interval. The equivalent digital algorithm is $$R_{AB}(k) = \frac{1}{N} \sum_{k=1}^{N} f_A(k\Delta t) f_B(k\Delta t = j).$$

In any real system there will be noise, whether the noise arises from misalignment of the sensors, signal distortion or external electromagnetic interference. If the noise is represented by $f_N(t)$, then the relation between the sensor outputs becomes $$f_A(t) = f_B(t+\theta) + f_N(t).$$

by substituting the above into the cross-correlation equation one obtains $$R_{AB}(t) = \frac{1}{P} \int_O^P f_A(t) [f_B(t+\theta) + f_N(t)] \, dt.$$

Separation of the integrals then provides $$R_{AB}(t) = \frac{1}{P} \int_O^P f_A(t) f_B(t+\theta) \, dt + \frac{1}{P} \int_O^P f_A(t) f_N(t) \, dt.$$

If there is no relation between $f_A(t)$ and $f_N(t)$ then the second interval will tend towards zero. If, however, the component $f_A(t)$ contains a noise component that is common mode to the component $f_N(t)$, the output $R_{AB}(t)$ will show a strong peak at $t=0$. This is a particular problem with 60 Hz and 120 Hz interference. The functions $f_A(t)$ and $f_B(t)$ both have power spectrums that will be high frequency limited, with a bandwidth BW. The peak of the cross-correlation function $R_{AB}(t)$ centered at $\theta$ will have a width at its midpoint of 1/BW. In order to obtain an accurate value for the maximum output $R_{AB}(\theta)$ it is desirable that the peak width 1/BW be as narrow as possible. Therefore, the larger the bandwidth, the more accurate the measured value of $\theta$.

The accuracy of the time interval $\theta$ is also related to the integrating period P. The larger P is, the less variation $\theta$ will have, however, for velocity measurement the fast response time is also desirable. The integrating period P should be selected with both of these factors in mind.

High pass filtering will improve the sharpness of the P at $\theta$ and eliminate low frequency noise. Care must be taken, however, in selecting the cutoff frequency so as to not to affect signal strength or bandwidth.

One construction in this investigation utilize sensors comprising a light emitting diode source focused on the jet through a lens. The reflected signal was focused on a photodiode matched to the light emitting diode. With this structure, the strong signal could only be obtained when the light emitting diode and photodiode were at their focal point. Positioning of the sensors was critical, and any change in the jet angle required repositioning of the sensors. The low power of the light emitting diode made it necessary to position the sensors very close to the jet. This gave, as mentioned above, a very noisy signal and splashing would frequently obscure the lens and block the signal entirely.

Figure 2:
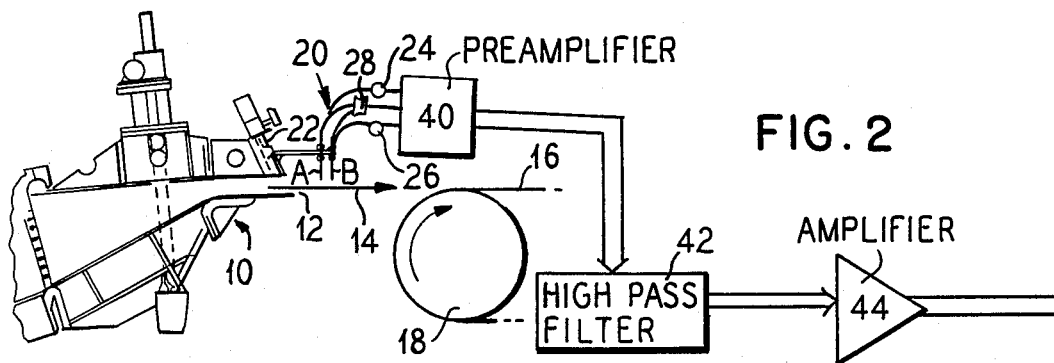
FIG. 2 is a side view of the jet end of a headbox adapted for using the present invention, showing the present invention in schematic form.
Figure 3:
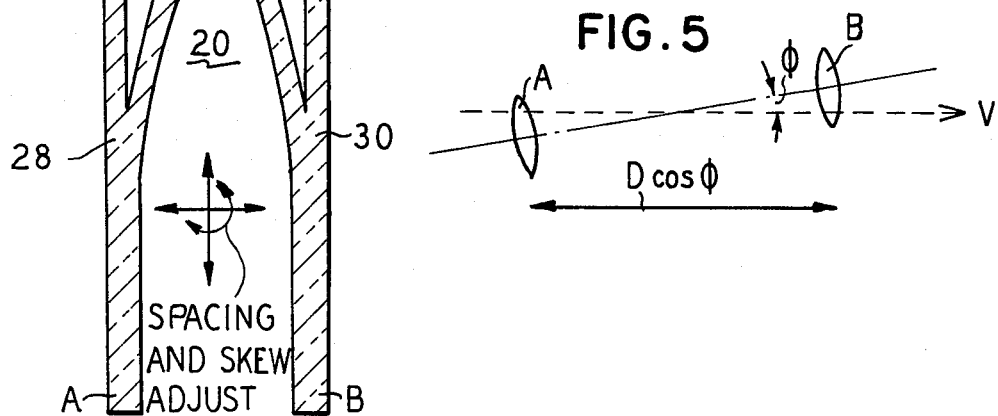
FIG. 3 is an enlarged view of a pair of bifurcated fiber optics fed by a single source and feeding a pair of photodiodes.

Referring to FIGS. 2 and 3, the above disadvantage was overcome, i.e. the positioning sensitivity was alleviated, by providing bifurcated fiber optic bundles light-coupling a light source to a pair of sensors, such as PIN diodes. As a light source, an incandescent source was employed which could be varied in intensity. This solved the problem of a low power source, and the fiber optics minimize the effects of splashing.

The signals from the photodiode were fed to and filtered by a 200 Hz high pass filter, amplified and stored for later analysis. For the analysis, a FFT Ubiquitous two-channel spectrum analyzer was used for data analysis.

In FIGS. 2 and 3, the jet end of a headbox is generally illustrated at 10 as comprising a slice 12 for forming a jet 14 which is delivered onto a Fourdrinier wire 16 carried on a roll 18, which for purpose of clarity has been illustrated to the right of the headbox slice 12, rather than below and immediately adjacent thereto. The sensing positions A and B of FIG. 1 are illustrated above the jet 14 a spaced apart in the direction of flow.

A fiber optic structure 20 couples a light source 28, here an incandescent lamp, to a pair of light sensors, here photodiodes, 24 and 26, by way of reflection from the headbox jet 14.

As best seen in FIG. 3, the fiber optic structure 20 comprises a pair of fiber optic bundles 28 and 30. Each of the fiber optic bundles is bifurcated, as illustrated at 32-38, so that the light source 28 feeds the bifurcations 32 and 36 to transmit a pair of light beams towards the headbox jet, while the bifurcations 34 and 38 support light reflections from the jet to the respective photodiodes 24 and 26.

Turning back to FIG. 2, the electrical signals generated by the photodiodes are fed to a preamplifier 40 before being applied to a high pass filter 42, for example a 200 Hz high pass filter. The filtered signals are then amplified by an amplifier 44 and fed to a data recorder 46 and to a spectrum analyzer 48.

In this investigation, test were made on the cross-correlation velicometer of the present invention to determine accuracy, linearity, operation in an adverse environment and positioning effects o velocity measurement.

In these tests, those relating to accuracy, linearity and positioning errors were first performed in a fluid mechanics lab flow loop. All of the results, which are set forth below, were calibrated against a laser Doppler anemometer. The effect of signal penetration into the jet and the effects of the jet surface characteristics on the correlated velocity were also determined. Subsequently, the velicometer was operated in conjunction with an experimental paper machine for an extended study of operation in that environment. As will be evident from the discussion below, the results were compared to the calculated headbox flow velocities and to the results from the test in the fluid mechanic lab.

A final set of tests were performed with a large flow loop to compare the cross-correlated velocity against the velocity calculated from a pivot tube measurement. All of these results are also set forth below.

In determining measurement errors, the cross-correlation coefficient and signal-to-noise ratio were determined. The cross-correlation coefficient XCC is a measure of the degree to which the signal $f_A(t)$ and $f_B(t)$ contribute to the correlation peak $R_{AB}(\theta)$. The cross-correlation coefficient is calculated by the expression $$XCC = \frac{R_{AB}(\theta)}{[R_{AA}(0) \cdot R_{BB}(0)]^{1/2}}$$

where a value of "1" is for identical signals, and the value "0" is for signals having no similarity.

The signal-to-noise ratio S/N is calculated by dividing the mean of the signals autocorrelation $R_{AA}(0)$ by the autocorrelation $R_{NN}(0)$ of the noise function in accordance with the expression $$S/N = \frac{R_{AA}(0)}{R_{NN}(0)}.$$

Figure 4:
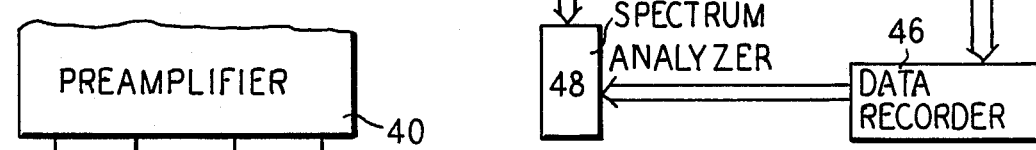
FIG. 4 is a schematic illustration of the light spot geometry, particularly light spot length and width.

As to light spot geometry, and in reference to FIG. 4, the signal $f_A(t)$ and $f_B(t)$ are the AC components of the backscattering of two light spots on the surface of the headbox jet. The light spots have a finite area, so that the signals measured therefrom will be instantaneous averages of the events taking place across their areas. The shape and alignment of the spots will affect the quality and accuracy of the signals.

Increasing the spot widths across the flow direction (here the x direction) provides the sensors a larger field of view, with more points of similarity than can be correlated. This increases the degree of correlation or the correlation coefficient XCC, and the signal-to-noise ratio. The light spot width is limited to the view of the sensors, and it serves no purpose to increase the same further.

Decreasing the spot length in the flow direction (here the z direction) narrows the averaging area of the light spot, which increases the bandwidth. The provides a sharp peak at $R_{AB}(\theta)$; however, if the length is decreased too much it will affect th signal strength.

Figure 5:
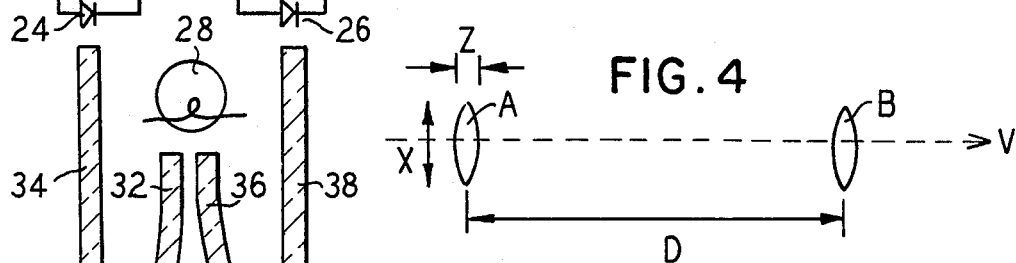
FIG. 5 is a schematic illustration of light spot misalignment or skew with respect to the direction of flow.

Referring to FIG. 5, misalignment of the light spots in the flow direction, that is in the z direction, introduces a cosine error into the separation distance D, and decreases the cross-correlation coefficient XCC. If the misalignment is great enough, the light spots will have no points of similarity along the flow and the degree of correlation will be zero. Increasing the spot width, of course, helps to alleviate this problem.

The positioning of the sensing optics over the headbox jet introduces some errors which are related to the light spot and cosine errors. In the test to determine these errors, a circular light spot 1.982 mm in diameter was used, and the sensors were separated by 5.974 mm. The parameters investigated were the distance from the jet surface, the horizontal skew, the vertical skew and the sensor separation.

Figure 15:
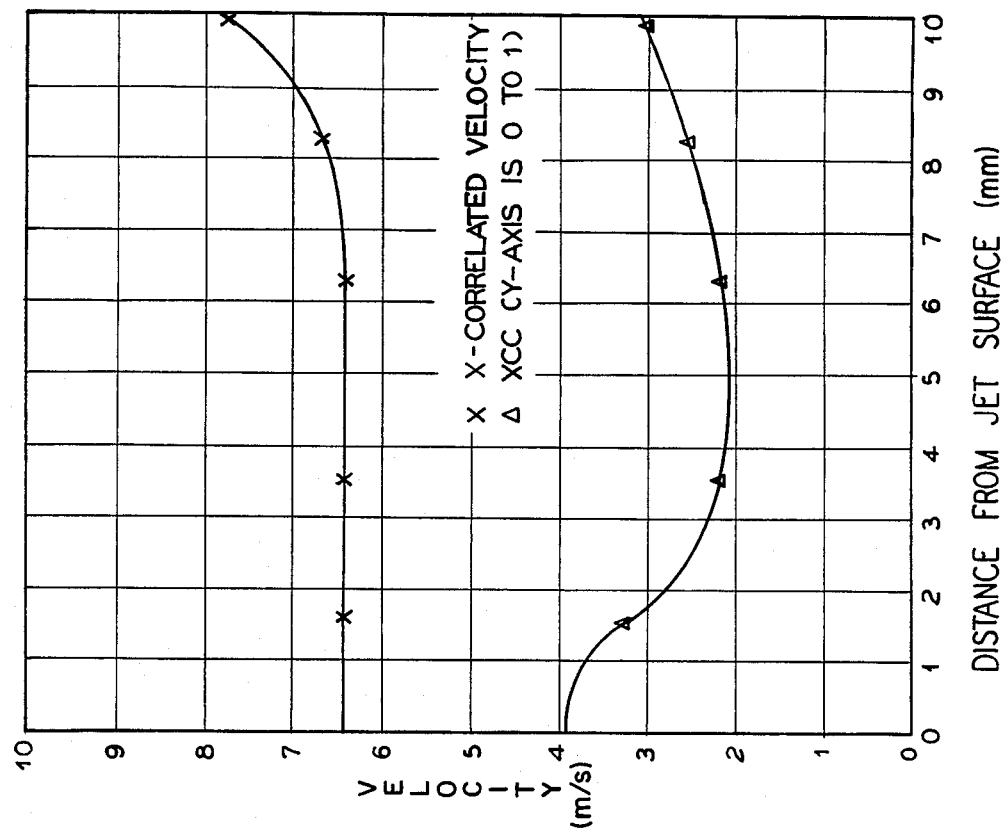
FIG. 15 is a graphic illustration of errors introduced into the system by sensor distance above the headbox jet.
Figure 14:
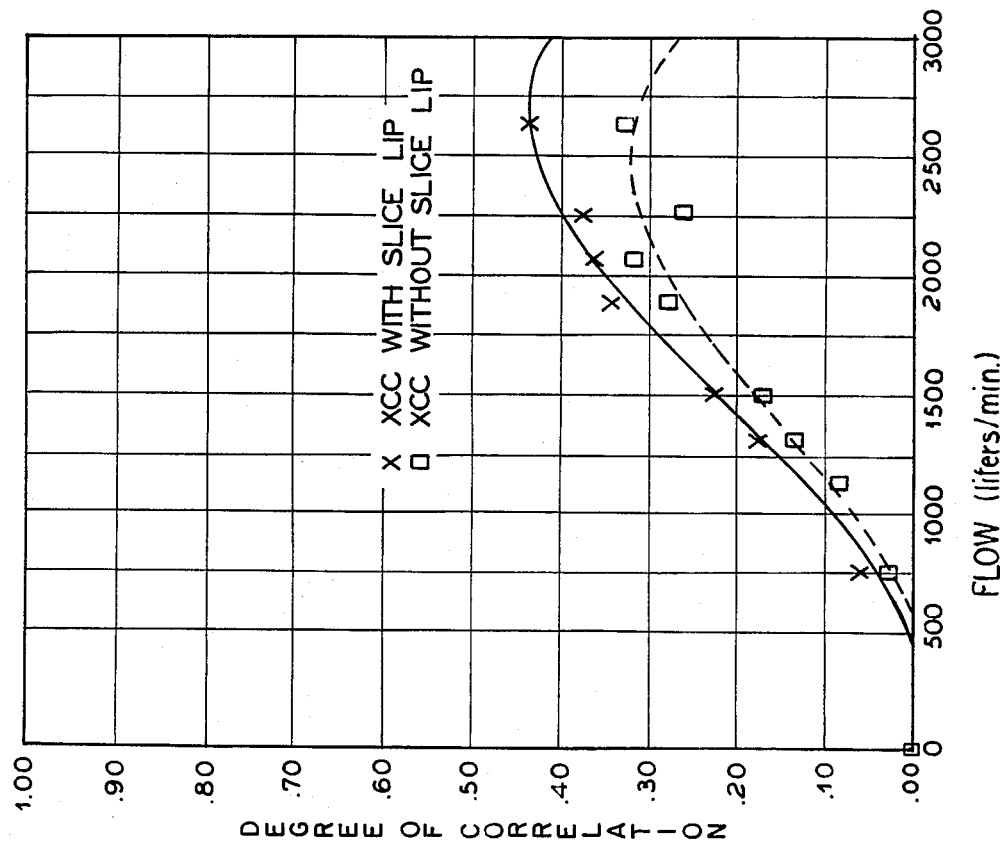
FIG. 14 is a graphic illustration of cross-correlation coefficients with respect to the velocity of the two runs of FIGS. 12 and 13.
Figure 17:
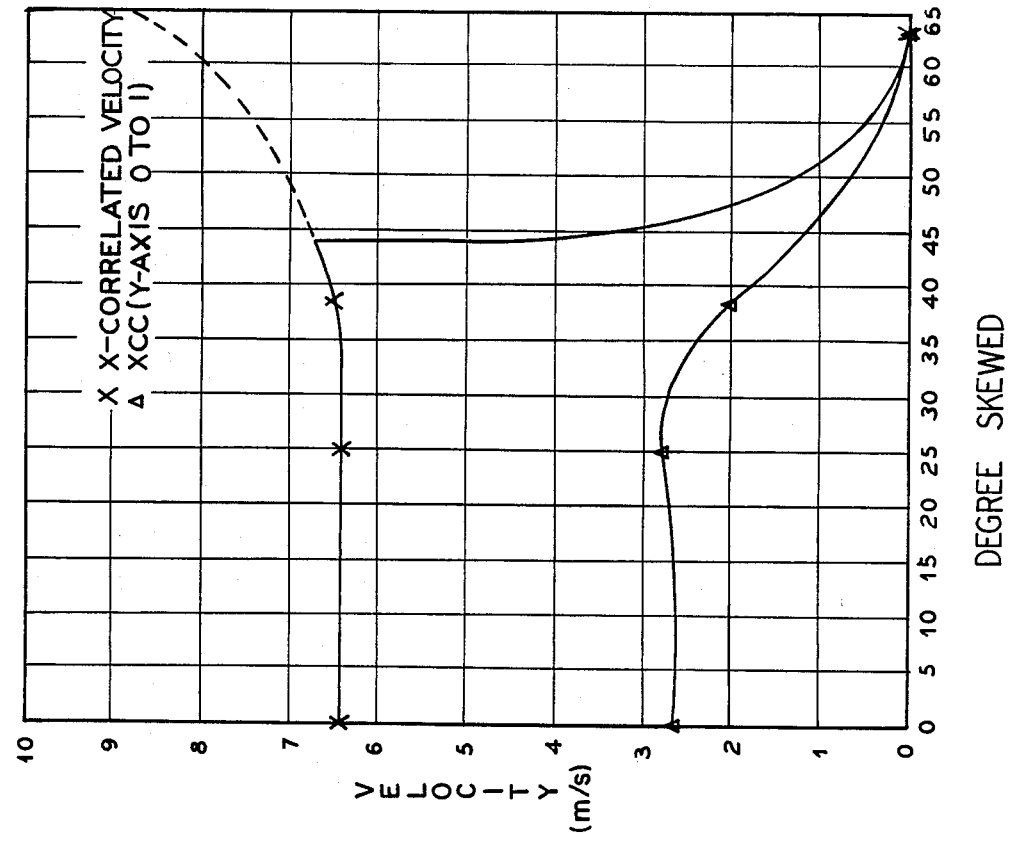
FIG. 17 is a graphic illustration of the error introduced by vertical skew of the sensing positions.

The distance of the sensors from the jet surface did not introduce significant error into the correlated velocity if kept within certain limits. This is largely due to the use of fiber optics, which hold the spot size much more constant than a lens. As the sensors are moved away from the jet surface, the spot size begins to increase, narrowing the effective bandwidth and causing the correlation peak to broaden. The cross-correlation coefficient XCC is also decreased, giving a lower signal-to-noise ratio. At approximately 6.35 mm from the jet surface, the light spots begin to overlap. This overlapping shifts the averaging areas of the sensors towards one another, causing the sensor separation distance to appear smaller and the velocity to increase as illustrated in FIG. 15.

Skewing the sensors horizontally to the flow direction introduces a cosine error, as mentioned above, in the distance D and lowers the signal-to-noise ratio by reducing the area of the spots that is corelatable in that the distance is now a distance D' in accordance with the relationship $$D' = D\cos\theta.$$

Figure 16:
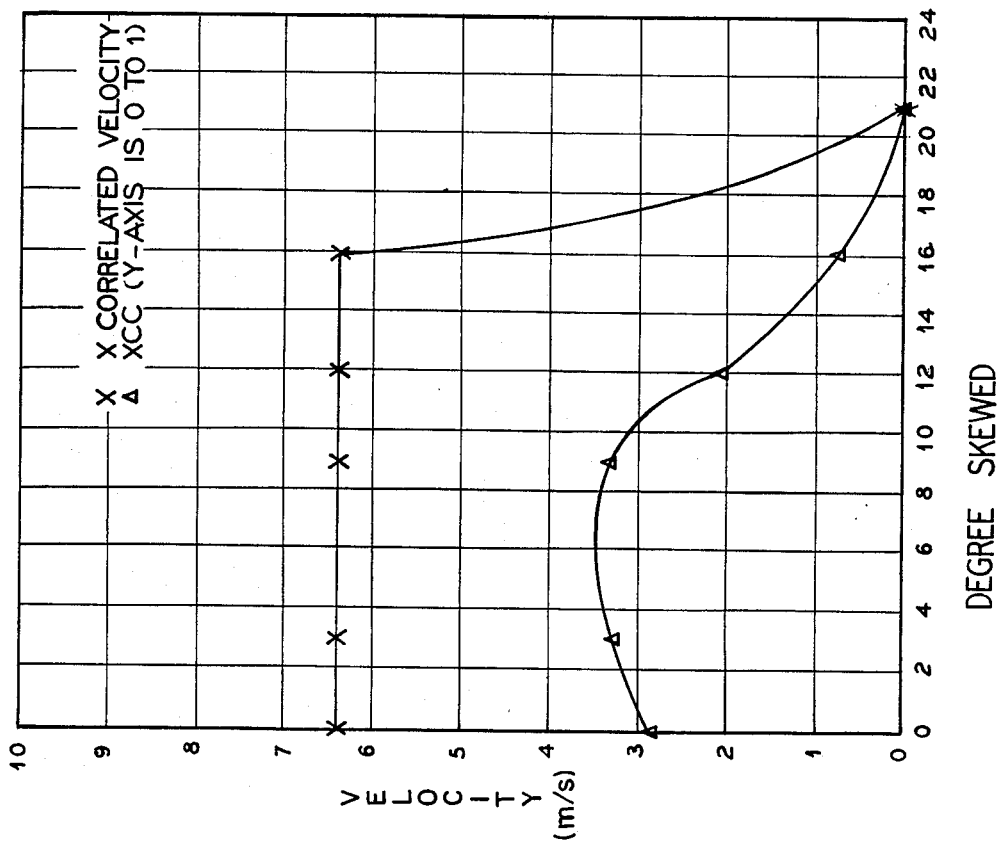
FIG. 16 is a graphic illustration of error introduced by horizontal skew of the sensing positions with respect to the direction of flow of the headbox jet.

From the investigations, cosine error proves negligible compared to the sampling period errors of the cross-correlation process. The positioning of the peak $R_{AB}(\theta)$ is not affected by such skewing until the limit of the sensor alignment is reached. The decrease in the signal-to-noise ratio as the areas of similarity in the light spots decrease is consistent with expected performance, as is indicated in FIG. 16.

The separation between the sensor positions is very critical and the operation of a device constructed in accordance with the present invention. An increase of the sensor position spacing will provide the surface characteristics of the jet with more time to change between the light spots. This will increase the signal-to-noise ratio until the correlation is eventually lost. Decreasing the sensor position spacing provides a better correlation, but with the smaller transit times between the sensor positions, the correlation instrument will have a larger uncertainty in the time delay $\theta$ measured.

The minimum spacing to maintain measuring period uncertainties within 0.5% may be calculated by the expression $$D_{min} = 100 \text{ PV/N}.$$

The minimum spacing is also limited by the size and shape of the light spots.

The turbulence signal loss does not affect the position of the $R_{AB}(\theta)$ peak, so that it does not become a significant factor in the cross-correlation function until the signal-to-noise ratio is reduced significantly. The light spot size produces a filtering and averaging effect on the signals such that its z width can be used to calculate an approximate maximum sensor position separation in accordance with the expression $$D_{max} = jw,$$

so that the limits on the value D are $$jw \geq D \geq 100 \text{ PV/N}.$$

Further errors are introduced by the signal penetration into the jet. These errors are:
(1) Signal loss—low cross-correlation coefficient XCC;

(2) Reflection from the bottom of the jet—$R_{AB}(\theta)$ shift and/or broaden; and (3) Averaging of vertical velocity profile—narrower bandwidth and $R_{AB}(\theta)$ shift.

The first error (1) does not directly affect the time position of the cross-correlation function. Its main effect is a reduction in signal strength, which is only significant in clear solutions with very little turbulence.

In the second source of error (2), a portion of the signal is transmitted through the jet to its bottom surface where it is reflected back to the sensors. If the bottom surface of the jet is traveling at a slightly different velocity from the top surface, the relationship of the signal $f_A(t)$ and $f_B(t)$ becomes $$f_A(t) = \frac{A_0 f_B(t + \theta_1) + A_1 f_B(t + \theta_2)}{A_0 + A_1}.$$

Then the cross-correlation function is:

$$R_{AB}(t) = \frac{1}{P} \int_0^P f_A(t) \left[ \frac{A_0 f_B(t + \theta_1) + A_1 f_B(t + \theta_2)}{A_0 + A_1} \right] dt =$$

$$\frac{A_0}{P(A_0 + A_1)} \int_0^P f_A(t) f_B(t + \theta_1)\, dt +$$

$$\frac{A_1}{P(A_0 + A_1)} \int_0^P f_A(t) f_B(t + \theta_2)\, dt.$$

This will provide a peak at $\theta_1$ and $\theta_2$. With flows of nearly the same velocities, only one peak will show up in the cross-correlation function, but it will be broadened and shifted in time.

Figure 7:
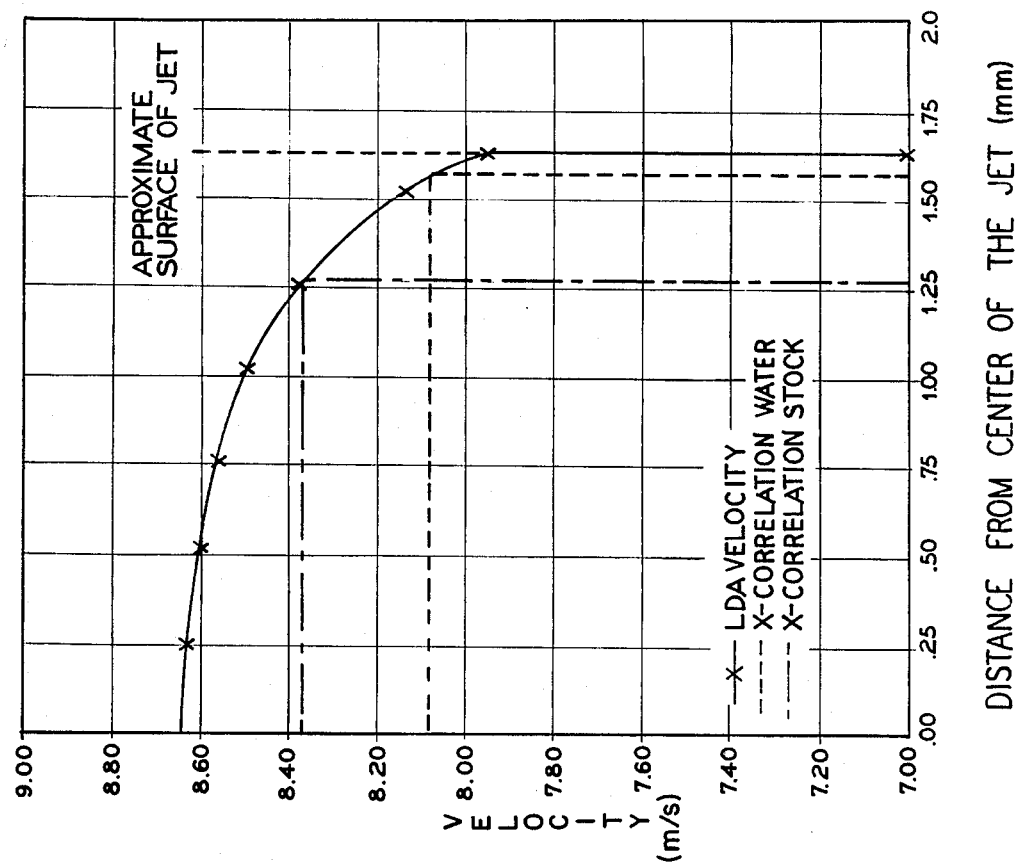
FIG. 7 is a graphic illustration of signal penetration and skew due t changes in jet velocity.

FIG. 7 illustrates a loser Doppler anemometer measured vertical velocity profile. Superimposed on this graphic illustration is the cross-correlated velocity in clear water under the same conditions. If the top surface of the jet is 1.626 mm from its center, then the cross-correlated velocity at that point should be 7.95 m/s. The measured velocity is 8.08 m/s, a difference of 1.6%, which can be partially attributed to the lower surface reflection. As the solution measure becomes more opaque, this source of error becomes negligible.

The third ad last source of penetration error (3) is averaging. This becomes significant in a well-seeded flow, and is actually a broader case of surface reflection error. In a fluid seated with pulp fibers or other reflecting medium, the light spot will penetrate and provide back-scatter signals from particles at various steps. The strongest signals will come from close to the surface, but the signals from different depths, moving at different velocities will introduce errors into the signal. The cross-correlation function for this signal is $$R_{AB}(t) = \frac{1}{P(A_0 + A_1 + A_2 + \ldots + A_n)}$$

$$\left[ A_0 \int_0^P f_A(t) f_B(t + \theta_1) dt + A_1 \int_0^P f_A(t) f_B(t + \theta_2) dt + \right.$$

$$\left. \ldots + A \int_0^P f_A(t) f_B(t + \theta_n) dt \right],$$

and the averaged peak $R_{AB}(\theta')$ is $$R_{AB}(\theta') = \frac{A_0 R_{AB}(\theta_1) + A_1 R_{AB}(\theta_2) + A_2 R_{AB}(\theta_3) + \ldots + A_n R_{AB}(\theta_n)}{A_0 + A_1 + A_2 + \ldots A_n}.$$

The more opaque the solution, the less penetration depth and the time spread will be narrower.

FIG. 7 also shows the cross-correlated velocity for a 0.3% softwood pulp solution. The difference between the surface velocity and the measured velocity is 5.2%. This shows a much greater average penetration into the jet than the velocity in water, which would be expected with the greater, velocity differential over the depth sample. This error may be desirable if the average velocity of the jet is to be measured. Increasing the power of light source 28 will provide a greater penetration, and a more realistic average of the velocity.

The following table is an error analysis summary for the above-discussed investigations.

TABLE I

ERROR ANALYSIS SUMMARY

| Source of Error | % Uncertainty | |
|---|---|---|
| | "Normal" | "Worst Case" |
| Signal Processing | | |
| Sampling | +0.29 | +0.49 |
| Bandwidth | +0.01 | +1.67 (estimated) |
| Sensor Positioning | | |
| Distance from Jet | 0 | +3.13 |
| Horizontal Skew | +0.06 | +3.13 |
| Vertical Skew | 0 | +1.56 |
| Separation | +0.29 | +0.49 |
| Flow Penetration | ±1.50 | ±4.39 (compared to surface velocity) |
| Maximum % Uncertainty | 2.15% | 15.59% |

If the flow penetration errors are compensated, or are desirable, the per cent uncertainly for normal operation can be brought down to 0.65%.

The following table sets forth symbols and the meanings thereof, for the symbolic elements of the above equations.

TABLE II

| Symbol | Designation |
|---|---|
| A, B | Sensor Positions |
| $A_0, A_1 \ldots$ | Amplification factor representing the magnitude of that portion of the backscattered signal |
| BW | Bandwidth |
| D | Distance between sensor positions |
| $j$ | The sample corresponding to the time delay $\theta$ between sensor positions |
| $k$ | A sample within the range N' corrresponds to the time $t$ |
| N | Total number of samples taken |
| P | Period over which the signals are integrated |
| $R_{AB}$ | The cross-correlation function |
| $R_{XX}(0)$ | Value of the autocorrelation signal at the time $t=0$ |
| V | Jet velocity |
| w | Spot width in the $z$ (flow) direction |
| $\emptyset$ — | Angle sensor positions are off parallel with respect to the jet |
| $\theta$ | Time delay between the sensor positions A and B |

Figure 6:
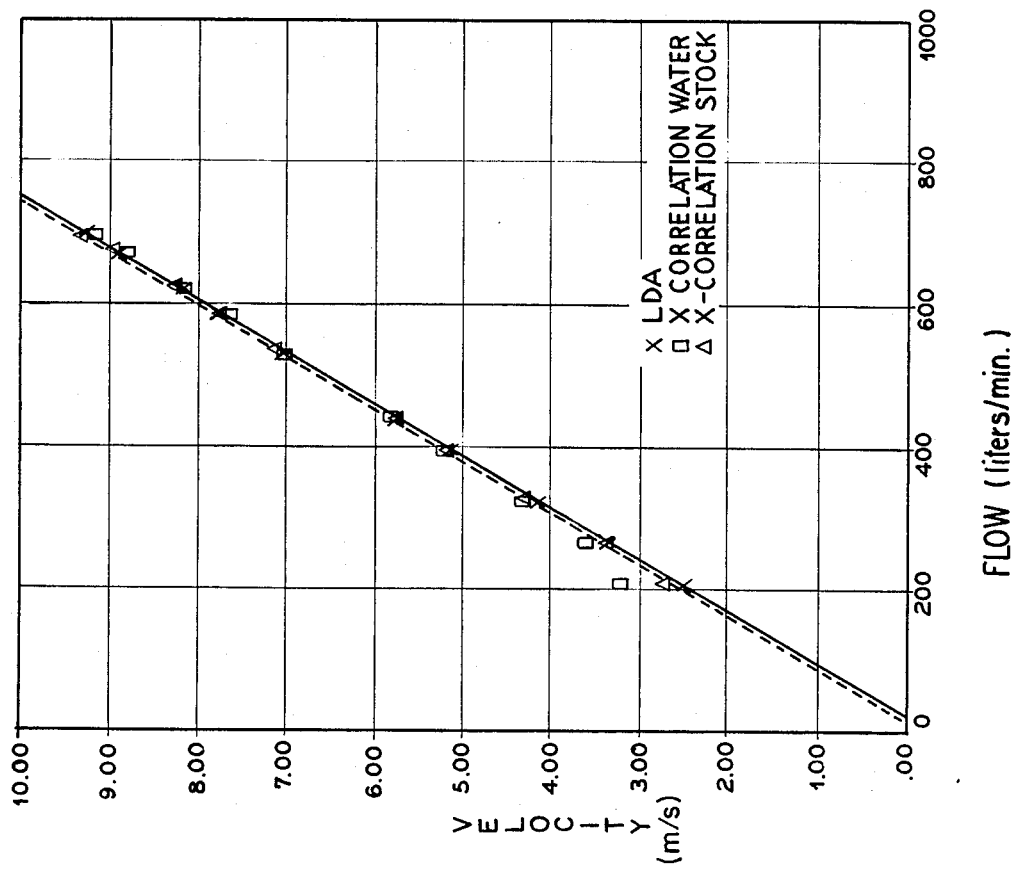
FIG. 6 is a graphic illustration showing calibration of the present flow meter against a laser Doppler anemometer.

The calibration of the cross-correlation flow-meter against the laser Doppler anemometer is illustrated in FIG. 6. The cross-correlated velocity of water is the least accurate of the measurements and has a linearity of 0.99870. The linearity of the velocity using stock is 0.9987, which is the same as the linearity of the laser Doppler anemometer measured velocity. The error in the cross-correlated velocity is greater at the lower jet velocities, particularly in a water jet. This error is partially a result of the narrowed bandwidth due to lower frequency turbulence, and in the case of water partially due to reflection from the jet's lower surfaces. The skew of the cross-correlated velocity is compared to the laser Doppler anemometer is evident in FIG. 7 which illustrates the average penetration of the cross-correlated signals into the jet surface compared to the point at which the laser Doppler anemometer signals were collected. As the jet velocity is changed, the signal collection points within the jet will shift, skewing the final graph. Because the cross-correlation in stock is closer to the laser Doppler anemometer signal collection point than that in water it should skew less, which is readily apparent from FIG. 7. There is less skew from the theoretical the deeper the signal penetrates into the jet.

Figure 8:
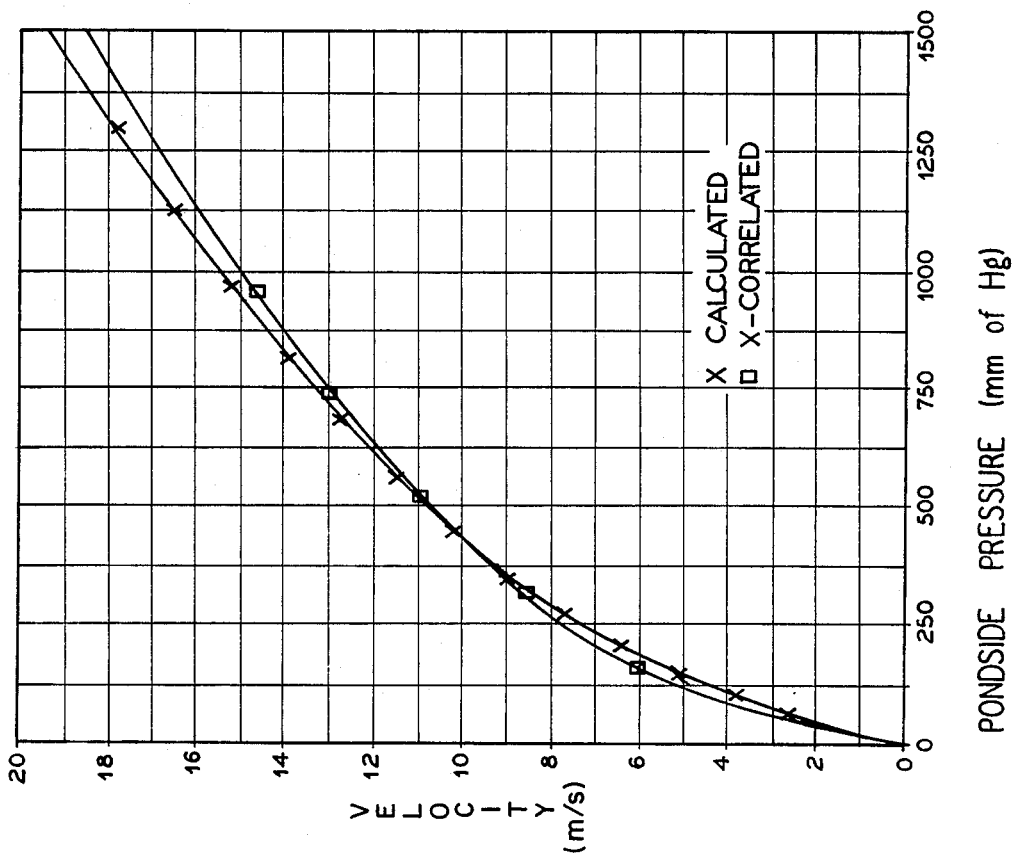
FIG. 8 is a graphic illustration comparing the cross-correlated jet velocity with the jet velocity calculated from the headbox pressure.
Figure 9:
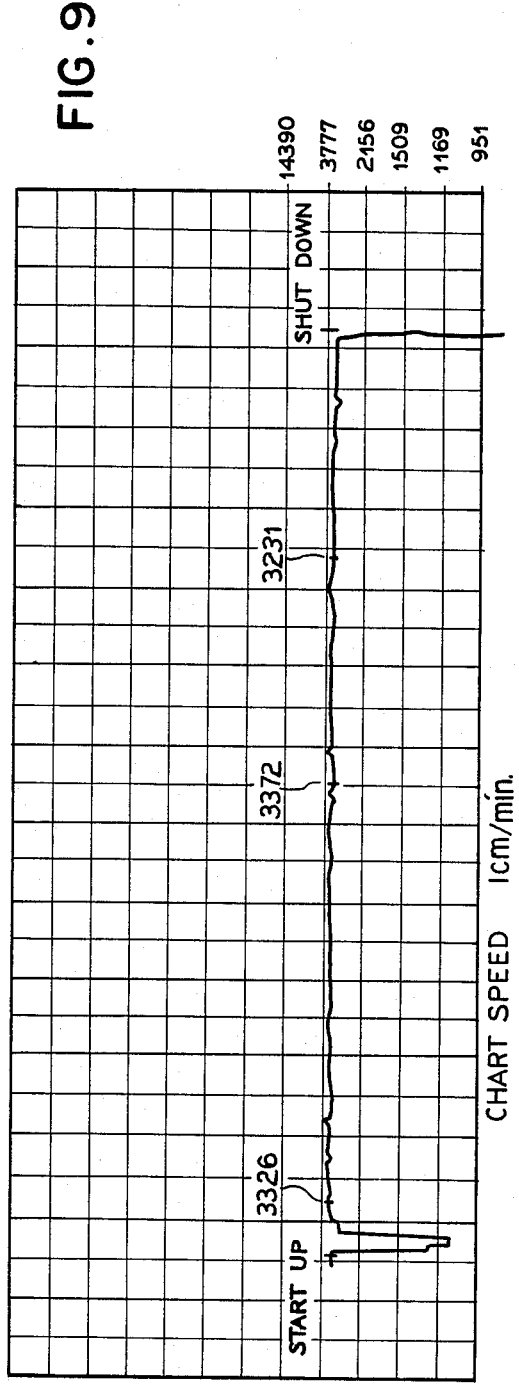
FIGS. 9 and 10 are graphic, trip chart illustrations of a paper machine run from start-up to shut-down, with FIG. 9 illustrating constant velocity from start to shut-down and FIG. 10 illustrating a run having the flow dropped in stages prior to shutdown.
Figure 10:
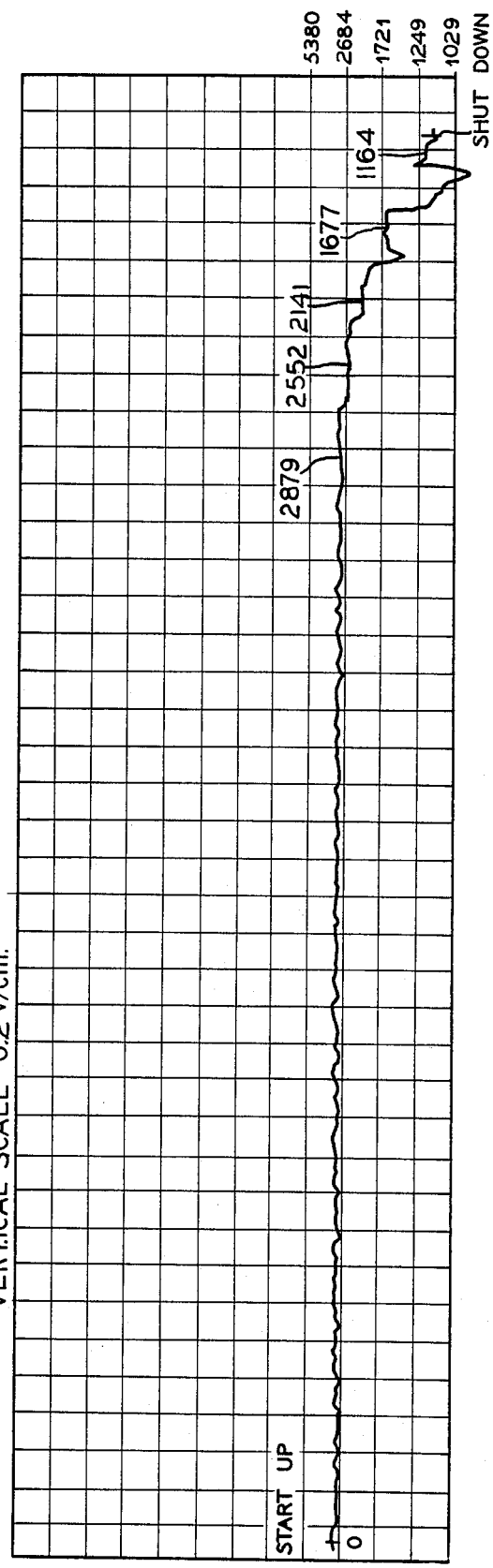

Referring to FIG. 8, the cross-correlated jet velocity is compared to the jet velocity calculated from the headbox pressure on a paper machine. As is evident, the curves are of similar shape, but there is some variation from the theoretical jet velocity. The strip chart graphs of FIGS. 9 and 10, as briefly mentioned above, are of a paper machine run from startup to shutdown. These graphs illustrate the response of a device to slight changes in velocity when it is employed as a continuous read out device. FIG. 9 illustrates a continuous run, while FIG. 10 illustrates a run having the flow dropped in stages at the end of the run.

The results of the large flow loop mentioned above are illustrated in FIGS. 11, 12, 13 and 14.

Figure 11:
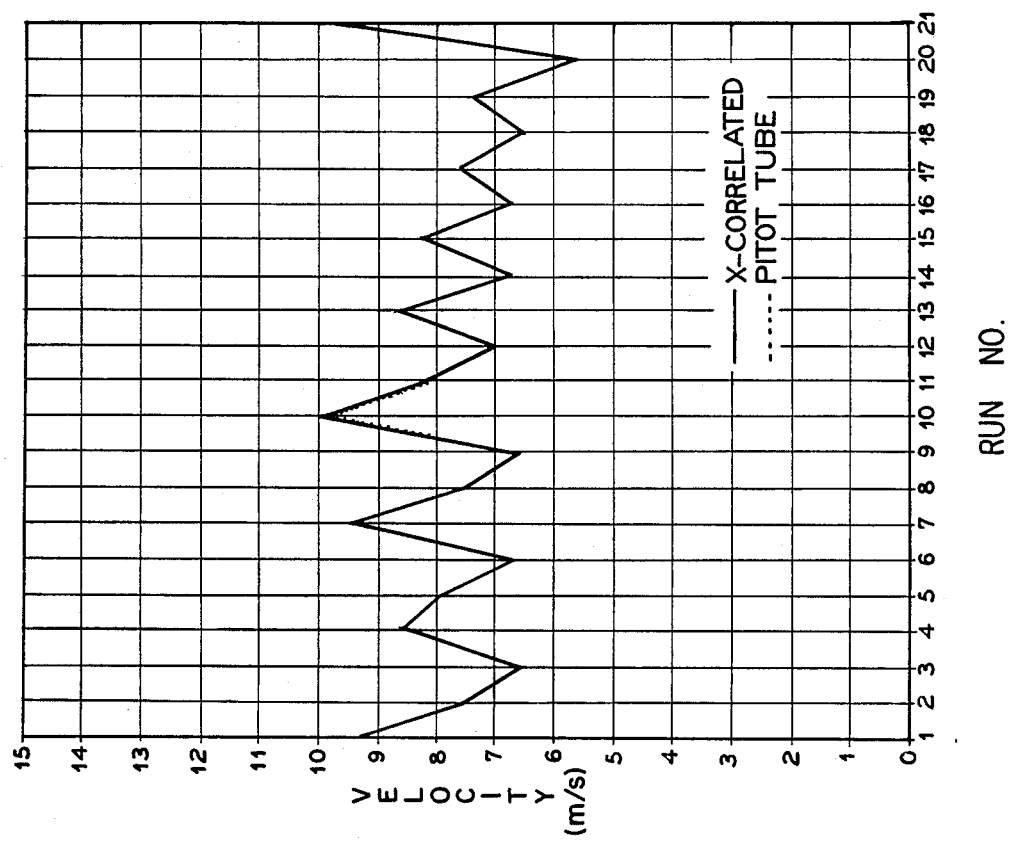
FIG. 11 is a graphic illustration of data taken over a series of runs at varying flow rates and slice openings.

FIG. 11 shows a comparison of data taken over a series of 21 runs having varying flow rates and slice openings. The measurements correspond very well at the lower velocities, with some significant variations at the higher velocities This is attributed to the result of the pitot tube measuring the center of the jet and the cross-correlation measuring the surface. At the higher jet velocities, the differential between the surface and center velocity will be greater. A linear regression analysis of this data provides a correlation coefficient of 0.9572.

Figure 13:
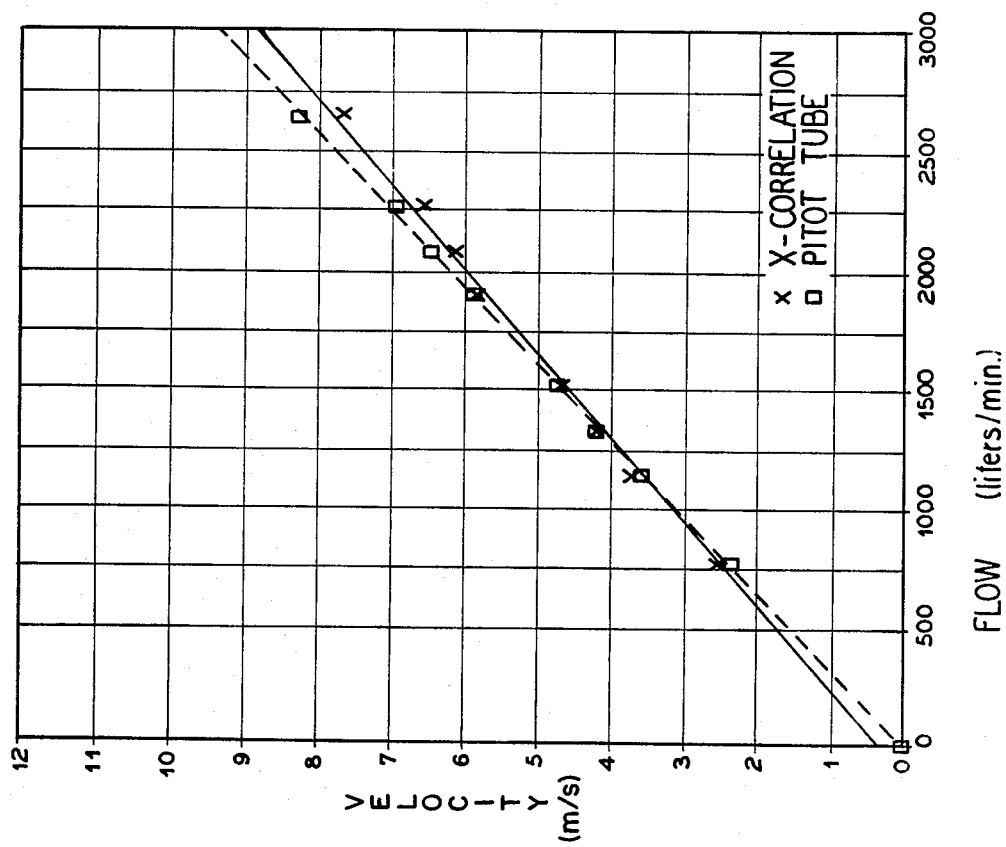
FIG. 12 and FIG. 13 are graphic illustrations of paper machine runs of different flow rate with all other conditions constant.
Figure 12:
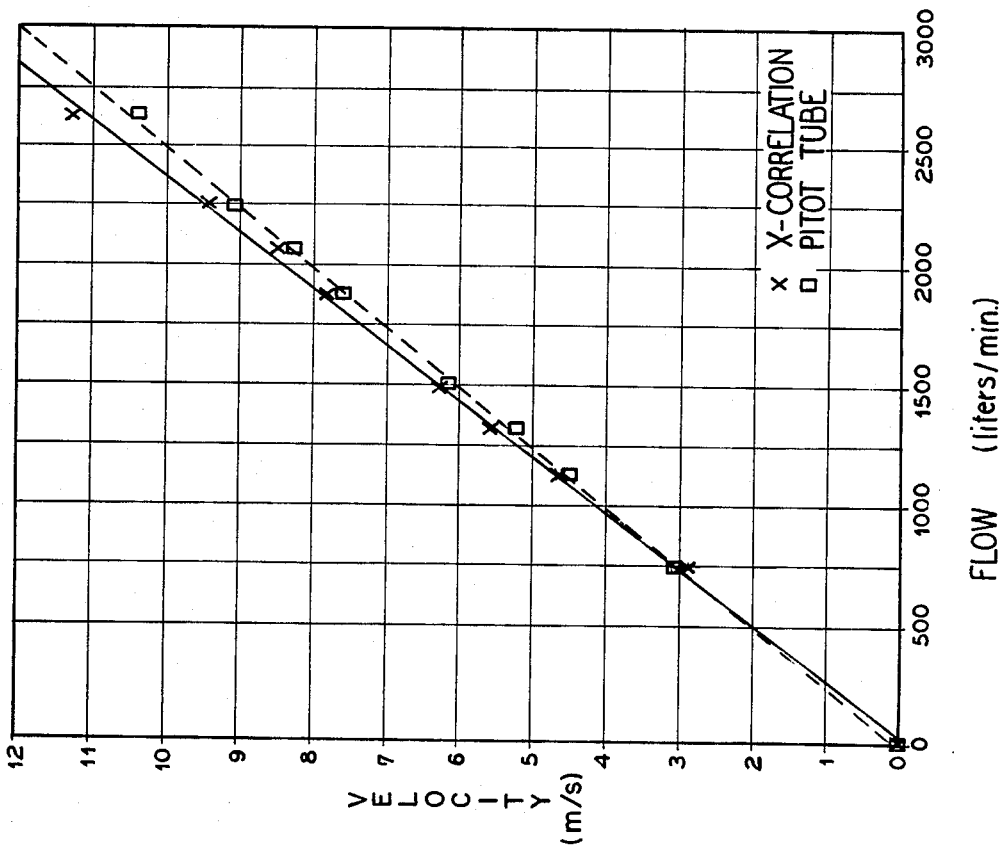

FIGS. 12 and 13 illustrate the jet velocity verses the quantity of flow for a machine in which the headbox has no slice lip and a $\frac{1}{4}''$ slice lip, respectively. The flow rate was varied while all other conditions remain constant. The data obtained is in general correspondence with that of FIG. 11. The data illustrated on FIGS. 12 and 13 have correlation coefficients of 0.9979 and 0.9987, respectively. FIG. 10 is a graphic illustration of the cross-correlation coefficients verses the velocity of the two runs of FIGS. 12 and 13. As the jet velocity increases, there is less surface change between the sensor positions, and thus a greater degree of correlation. The bandwidth of the signal is also broadened by increased velocity, due to higher frequency turbulence on the jet surface.

The summarized error analysis of TABLE I provides the expected error for normal operation with good alignment of the sensors, and a "worst case" situation, where the signal is jet short of being lost. These errors are calculated assuming a 6 mm sensor spacing with light spots of 0.5 mm diameter. The measured medium is assumed to be a relatively opaque solution traveling at a velocity between 2 and 20 meters/second. The cross-correlation is assuming 1024 samples taken over a 3 ms period.

The cross-correlation jet velocity measurement according to the present invention adequately meets the requirements for headbox jet measurement. It does not in any way disturb the jet and it can operate reliably under very adverse conditions with minimal setup and maintenance.

The accuracy appears to be better than most existing methods of measuring jet velocity when the elements are properly aligned. Even with a certain amount of misalignment, the signal will usually be lost before the error in the reading becomes significant.

A device constructed in accordance with the present invention measures a surface velocity. If the center velocity of the jet is desired a correlation factor is necessary. For most uses, however, the relative changes in the velocity are the most important parameters and in such applications a device constructed in accordance with the present invention is very accurate.

From the foregoing discussion, it is abundantly clear that the fiber optic elements 28 and 30 of FIGS. 2 and 3 are adjustably mounted for adjustment with respect to spacing, horizontal and vertical skew and position above the headbox jet. It is also clear that the light source 28 may be varied in intensity to increase or decrease penetration into the jet.

Although I have described my invention by reference to a particular illustrative embodiment thereof, along with graphic illustrations of test results of working systems, many changes and modifications of the invention may become apparent to those skilled in the art without departing from the spirit and scope of the invention. I therefore intend to include within the patent warranted hereon all such changes and modifications as may reasonably and properly be included within the scope of m contribution to the art.

I claim:

1. Apparatus for measuring the headbox liquid jet velocity, said apparatus comprising:

variable intensity light generating means mounted adjacent to the liquid jet for generating light such that the velocity of the jet is able to be determined;

first bifurcated fiber optic light coupling means disposed between said generating means and the liquid jet for conducting light between said generating means and the liquid jet;

first light sensing means disposed adjacent to said generating means for sensing light generated by said generating means and conducted through said first coupling means and reflected from the liquid jet back through said first coupling means;

first signal generating means electrically-connected to said first light sensing means for generating a first electrical signal proportional to said light reflected back towards said first sensing means;

second bifurcated fiberoptic light coupling means disposed between said generating means and the liquid jet, said second coupling means being disposed downstream relative to said first coupling means for conducting light through said second coupling means between said generating means and the liquid jet;

second light sensing means disposed adjacent to said generating means for sensing light generated by said generating means and conducted through said second coupling means and reflected from the liquid jet at said downstream disposition back through said second coupling means;

second signal generating means electrically-connected to said second sensing means for generating a second electrical signal proportional to said light reflected back toward said second sensing means;

high pass filter means connected to said first and second signal generating means for filtering out components of said first and second signals below a predetermined frequency;

amplifier means connected to said high pass filter means for amplifying the filtered first and second signals;

analyzing means connected to said amplifier means and operable to cross correlate AC components of the amplified first and second signals for obtaining an output representing the velocity of the liquid jet;

adjustable mounting means connected to said first and second coupling means for permitting adjustment of the spacing between said first and second coupling means, and for permitting adjustment of the horizontal skew of said first and second coupling means such that the optimum sensitivity of the apparatus is obtained and any misalignment of the coupling means relative to the direction of flow of the jet may be compensated for; and said first and second coupling means having elongate ends adjacent to the surface of the jet for generating first and second light spots respectively on the surface of the jet, said spots being elongate in a direction transverse to the direction of flow of the jet such that misalignment of said spots relative to said direction of flow results in substantially the same surface area of the jet flowing past said first and second spots so that said first and second signals are substantially the same.

2. Apparatus as set forth in claim 1 wherein said light generating means is an incandescent lamp.

3. An apparatus as set forth in claim 1 wherein said first and second light sensing means include respectively, a first and second photo diode, said first photo diode being light-coupled to said first coupling means, said second photo diode being light-coupled to said second coupling means.

4. An apparatus as set forth in claim 1 wherein said adjustable mounting means permits adjusting the vertical skew of said first and second coupling means.

5. An apparatus as set forth in claim 1 wherein said adjustable mounting means permits adjusting the spacing of said first and second coupling means relative to the surface of the liquid jet.

6. An apparatus as set forth in claim 1 further including:
a preamplifier connected between said first and second light sensing means and said high pass filter.

7. An apparatus as set forth in claim 1 wherein said analyzing means comprises a FFT Ubiquitous two-channel spectrum analyzer.

8. An apparatus as set forth in claim 1 further including:
storage means connected to said amplifier means for storing data represented by said amplified first and second signals.

9. An apparatus as set forth in claim 1 wherein said first coupling means includes a first, second and third end thereof, said first end being disposed adjacent to the liquid jet, said second end being disposed adjacent to said first light sensing means and said third end being disposed adjacent to said light generating means;

said second coupling means including a first, second and third end, said first end of said second coupling means being disposed adjacent to the liquid jet at said downstream disposition thereof and downstream relative to said first end of said first coupling means, said second end of said second coupling means being disposed adjacent to said second light sensing means and said third end of said second coupling means being disposed adjacent to said light generating means.

10. An apparatus as set forth in claim 9 wherein said analyzing means is connected to said amplifier means for determining the delay time between the AC components of the first and second electrical signals by cross-correlation function comparison.

11. An apparatus as set forth in claim 10 wherein said analyzing means further comprises:
a spectrum analyzer operable in accordance with the expression $$R_{AB}(t) = \frac{1}{P} \int_0^P f_A(t) f_B(t + \theta) \, dt$$

where $f_A(t)$ and $f_B(t)$ represent the AC components produced via said first and second coupling means respectively, P is a predetermined period of integration, $\theta$ represents the delay time between $f_A(t)$ and $f_B(t)$ and $R_{AB}(t)$ is the cross-correlation output and has a maximum at $\theta$.

* * * * *